(12) United States Patent
Garska (10) Patent No.: US 7,144,063 B2
(45) Date of Patent: Dec. 5, 2006

(54) CONVERTIBLE ROOF FABRIC ATTACHMENT

(75) Inventor: Bradley R. Garska, Saline, MI (US)

(73) Assignee: ASC Incorporated, Southgate, MI (US)

( * ) Notice: Subject to any disclaimer, the term of this patent is extended or adjusted under 35 U.S.C. 154(b) by 67 days.

(21) Appl. No.: 10/827,098

(22) Filed: Apr. 19, 2004

(65) Prior Publication Data

US 2004/0251707 A1 Dec. 16, 2004

Related U.S. Application Data

(60) Provisional application No. 60/467,634, filed on May 2, 2003.

(51) Int. Cl.
*B60J 7/00* (2006.01)

(52) U.S. Cl. ............. 296/118; 296/107.06; 296/107.11

(58) Field of Classification Search ................ 296/118, 296/121, 107.11, 107.06; 135/119
See application file for complete search history.

(56) References Cited

U.S. PATENT DOCUMENTS

| | | | |
|---|---|---|---|
| 1,455,203 A * | 5/1923 | Hoagland | .................... 296/118 |
| 1,940,911 A | 12/1933 | Howatt | |
| 2,411,945 A | 12/1946 | Vigmostad et al. | |
| 2,569,724 A | 10/1951 | Mackie et al. | |
| 2,649,330 A | 8/1953 | Schamel et al. | |
| 2,707,129 A | 4/1955 | Orr | |
| 2,752,192 A | 6/1956 | Doty et al. | |
| 2,772,114 A | 11/1956 | Hennessy | |
| 2,954,999 A | 10/1960 | Fingerman et al. | |
| 4,708,389 A | 11/1987 | Maebayashi et al. | |
| 5,259,658 A | 11/1993 | Koppenstein et al. | |
| 5,269,582 A | 12/1993 | Muller et al. | |
| 5,427,429 A | 6/1995 | Piontek et al. | |
| 5,460,424 A | 10/1995 | Wagner | |
| 5,511,844 A | 4/1996 | Boardman | |
| 5,522,635 A | 6/1996 | Downey | |
| 5,540,476 A | 7/1996 | Cowsert | |
| 5,829,820 A | 11/1998 | Cowsert | |
| 5,887,936 A | 3/1999 | Cowsert | |
| 5,906,408 A | 5/1999 | Cooper | |
| 5,947,546 A | 9/1999 | Hilliard et al. | |
| 5,979,969 A | 11/1999 | Hilliard et al. | |
| 5,992,917 A | 11/1999 | Hilliard et al. | |
| 5,998,948 A | 12/1999 | Lange et al. | |
| 6,030,022 A | 2/2000 | Bormann et al. | |
| 6,102,467 A | 8/2000 | Laurain et al. | |
| 6,206,450 B1 | 3/2001 | Ide et al. | |
| 6,282,791 B1 | 9/2001 | Patelczyk | |
| 6,286,888 B1 | 9/2001 | Essig | |
| 6,295,713 B1 | 10/2001 | Hilliard et al. | |
| 6,302,471 B1 | 10/2001 | Windpassinger et al. | |
| 6,338,522 B1 | 1/2002 | LeBlanc | |
| 6,435,597 B1 | 8/2002 | Anders et al. | |
| 6,439,643 B1 | 8/2002 | Barker | |
| 6,447,050 B1 | 9/2002 | Plassmeyer et al. | |
| 6,464,285 B1 | 10/2002 | Schutt | |
| 6,550,843 B1 * | 4/2003 | Patelczyk | ................... 296/118 |

* cited by examiner

*Primary Examiner*—Stephen Gordon
(74) *Attorney, Agent, or Firm*—Harness, Dickey & Pierce, P.L.C.

(57) ABSTRACT

A vehicle convertible roof fabric attachment system provides a cross-car elongated member having a first channel and a second channel located parallel with the first channel, a fastener engaging and fully recessed within the channels, and a convertible roof inner layer secured by the fastener to the elongated member, separating a fastener head from a convertible roof outer layer.

19 Claims, 6 Drawing Sheets

CONVERTIBLE ROOF FABRIC ATTACHMENT

CROSS-REFERENCE TO RELATED APPLICATIONS

This application claims the benefit of U.S. Provisional Application No. 60/467,634, filed on May 2, 2003.

BACKGROUND AND SUMMARY

The present invention relates generally to convertible roofs for automobile vehicles and more specifically to a device and method to attach a convertible roof cover to a vehicle support structure.

Vehicle soft tops or pliable convertible roofs, hereinafter referred to as flexible covers, are commonly supported using a plurality of cross-car elongated support members, or "roof bows". Several component parts are normally required, including fasteners, to connect the flexible cover to the roof bows. Some designs locating the fasteners under an outer layer of the flexible cover permit the fasteners to be visible (i.e., as bumps or ridges) through the flexible cover from outside of the vehicle when the top is in its upright and stretched position. The disadvantage of these designs is both the detrimental effect to the flexible cover appearance and the potential for the fasteners to abrade the flexible cover material. Fasteners applied from the outside of the flexible cover potentially permit moisture entry adjacent to the fasteners and detract from the appearance of the flexible cover. Alternate roof bow and flexible cover attachment devices include snap fasteners with adjoining receiving fasteners, coupling devices to attach the flexible cover, and sealing strips added to the flexible cover. These additional components add to the complexity and cost of constructing a flexible cover for a vehicle and often detrimentally impact its appearance.

In accordance with a preferred embodiment of the present invention, a convertible roof fabric attachment system for an automobile vehicle provides at least one cross-car elongated member having a first channel defining a fastener retention section, at least a second channel disposed adjacent to the first channel, and a fastener engaging at least one of the channels to hold a flexible cover. In a further aspect, the fastener includes a head and a retention portion, the retention portion engaging the second channel until the head reaches a fully recessed position within the first channel. In another aspect of the present invention, a flexible cover attachment system includes a flexible covering having at least an inner layer and an outer layer wherein the inner layer is secured to the cross-car elongated members such that the fastener head is separably positioned from the outer layer. In a further aspect of the present invention, a method to attach a flexible cover to a vehicle is provided. In still another aspect of the present invention, a method to construct a vehicle flexible cover is provided.

The fabric attachment system and methods of the present invention are advantageous over conventional flexible cover systems in that the present invention provides a positive method/device to ensure that the fasteners are in a fully recessed position within the cross-car elongated support members of the vehicle roof and to separably space the fasteners from an outer layer of the flexible cover. At least one and preferably a pair of parallel aligned channels arranged in open communication with each other are provided in each of the cross-car elongated roof members to receive the fasteners. These channels are sized to receive the fastening elements of the fasteners and to provide a seating surface for the fastener head and a portion of the inner liner of the flexible cover or an insert disposed beneath the outer layer of the flexible cover. The cross-car elongated members of the present invention are also adaptable to receive interior trim or headliner pieces. Features of the channels formed in the cross-car elongated members of the present invention prevent the fasteners from abutting and potentially abrading the material of the vehicle flexible cover.

By providing the one or more channels in the cross-car elongated members of the present invention, fastener location is not critical and can be adjusted as necessary to retain a contiguous roof profile. A washer or similar plate structure can also be added beneath the head of the fastener to increase the surface area of contact between the flexible cover and the cross-car elongated member. This advantageously decreases the potential for the fastener tearing through the material of the vehicle flexible cover. Additional advantages and features of the present invention will become apparent from the following description and claims, taken into conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
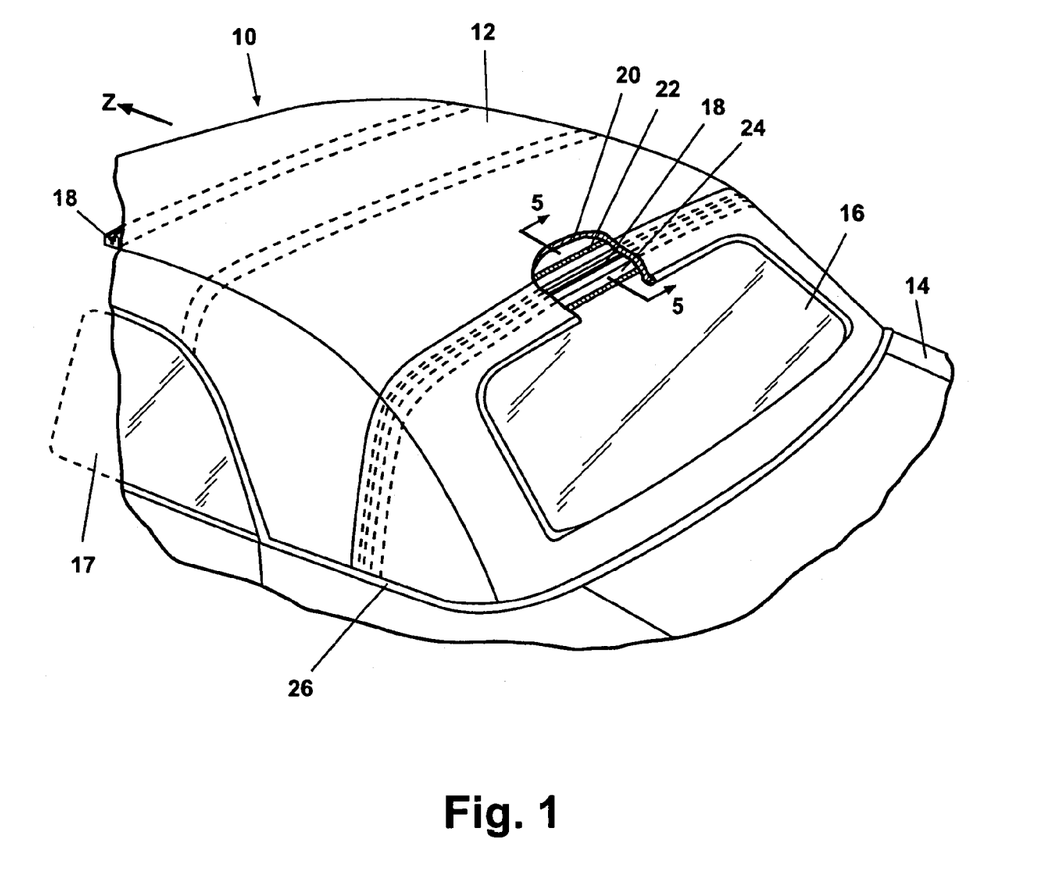
FIG. 1 is perspective view of a vehicle convertible roof having the attachment system of the present invention.
Figure 2:
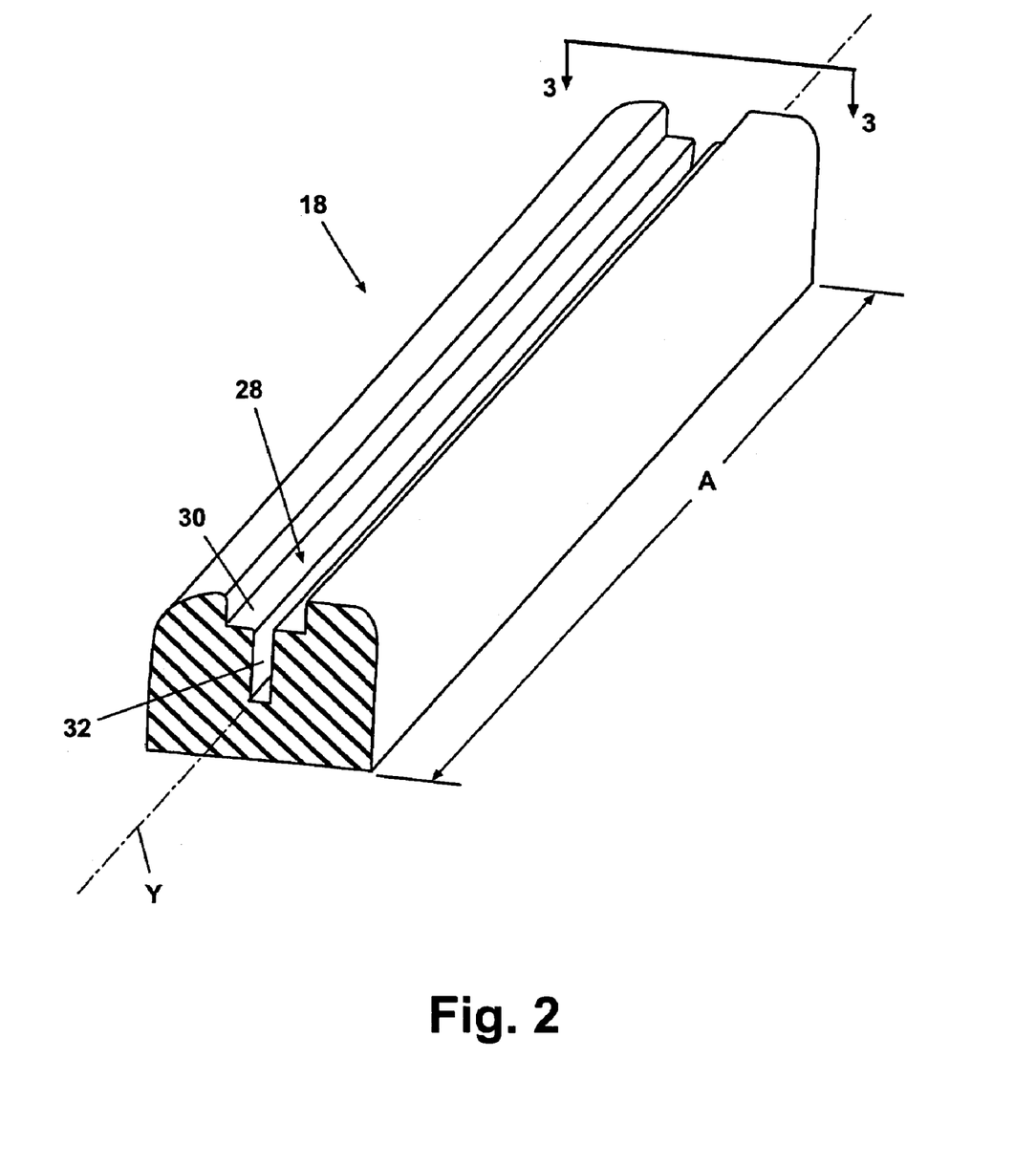
FIG. 2 is a fragmentary perspective view of a preferred embodiment cross-car elongated member of the present invention, having a pair of parallel, aligned channels formed therein.
Figure 3:
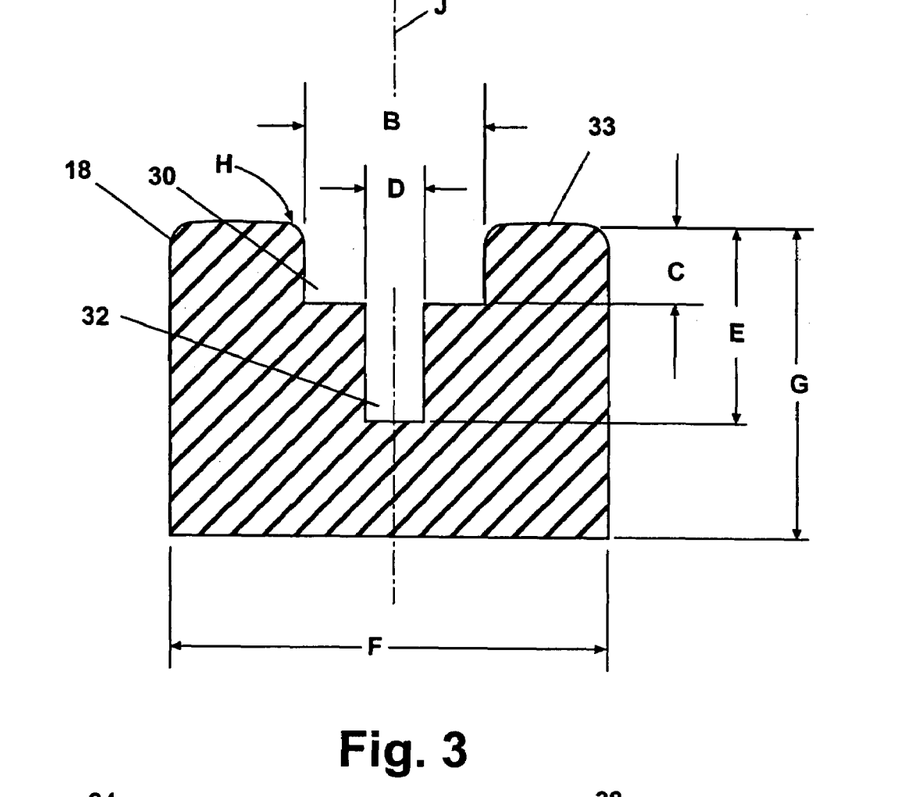
FIG. 3 is a cross sectional view, taken at line 3—3 of FIG. 2, showing the preferred geometry for the pair of parallel, aligned channels.

FIGS. 1–3 show the preferred embodiment of a convertible roof fabric attachment system of the present invention. A convertible roof fabric attachment system 10 includes a flexible cover 12 connectable to a vehicle 14. Flexible cover 12 includes a rear window 16 and a plurality of cross-car elongated members 18 which are spaced to support flexible cover 12. When fully extended as partially shown in FIG. 1, flexible cover 12 spans an opening 17 in vehicle 14, typically a passenger compartment. The cross-car elongated members 18, also known as roof bows when disposed perpendicular to a longitudinal centerline of vehicle 14, are commonly mechanically linked together by side rails as part of a retractable top stack assembly, such that operation of flexible cover 12 in an extension direction Z positions each of the cross-car elongated members 18 to stretch the material of flexible cover 12 in the deployed position partially shown in FIG. 1. Such a top stack assembly is disclosed in U.S. Pat. No. 5,998,948, entitled "Convertible Roof Actuation Mechanism" which issued to Piontek et al. on Jun. 27, 1995, and is assigned to the assignee of the present invention, the disclosure of which is incorporated herein by reference. It is also envisioned that cross-car elongated members 18 can also be fixedly spaced in an arrangement of a flexible cover such as a tonneau cover (not shown).

Flexible cover 12 commonly includes an outer layer 20 and an inner layer 22. Both outer layer 20 and inner layer 22 are supported on an outward facing surface of cross-car elongated member 18. Interior trim panels, such as a headliner 24, or alternately a polymeric garnish molding are also supported by cross-car elongated members 18 on an inner vehicle facing side of cross-car elongated members 18. Flexible cover 12 also includes an outer seal 26 formed about a perimeter of flexible cover 12 where flexible cover 12 contacts vehicle 14. Inner layer 22 and outer layer 20 are both preferably a nylon cloth material. Other polymeric materials can also be used which are suitable as water resistant materials.

As best seen in FIG. 2, each cross-car elongated member 18 preferably includes a channel pair 28 including an outer channel 30 and an inner channel 32. Both outer channel 30 and inner channel 32 are parallel aligned such that inner channel 32 opens into outer channel 30, as shown in reference to FIG. 3, and are preferably extruded throughout a member length A of each cross-car elongated member 18. The generally rectangular geometry of cross-car elongated member 18 shown in FIG. 2 is merely exemplary of a plurality of geometries for cross-car elongated members 18. The invention is not limited by the cross-sectional shape of the cross-car elongated members 18 shown. It should also be recognized that cross-car elongated members 18 are generally adapted, for example using bends (shown in phantom in FIG. 1), or other geometric shapes such as angles, etc. (not shown) to provide the desired shape or profile of flexible cover 12. Cross-car elongated members 18 are preferably extruded from metal materials, such as aluminum, which allow for simultaneous extrusion, or subsequent machining, of both the cross-car elongated member 18 and channel pair 28. In alternate embodiments, cross-car elongated members 18 can also be molded of polymeric material such as nylon 6/6 and reinforced with glass fibers, or formed as a composite of materials, including unfilled nylon 6/6, chopped glass fiber filled nylon 6/6, and/or aluminum or steel. Such a molded roof bow is disclosed in U.S. Pat. No. 5,427,429, entitled "Convertible Top Bow" which issued to Piontek et al. on Jun. 27, 1995, and is assigned to the assignee of the present invention, the disclosure of which is incorporated herein by reference. Such a composite roof bow is disclosed in U.S. Pat. No. 6,282,791 B1, entitled "Method of Making an Automotive Vehicle Convertible Roof" which issued to Patelczyk on Sep. 4, 2001, and is assigned to the assignee of the present invention, the disclosure of which is incorporated herein by reference.

In the preferred embodiment, cross-car elongated member 18 includes outer channel 30 having an outer channel width B and an outer channel depth C, as well as inner channel 32 having an inner channel width D and an inner channel depth E, respectively. A representative member width F and a representative member height G are also shown. Both the width and the depth of outer channel 30 and inner channel 32 are variable to suit the geometry of a fastener (shown and described in reference to FIG. 5) which engages channel pair 28. Outer channel 30 and inner channel 32 are preferably parallel aligned about a centerline J and in parallel with a longitudinal axis Y (shown in FIG. 2) such that inner channel 32 opens into outer channel 30. A radius H is also provided on a surface 33 adjacent to outer channel 30, to permit recessing a portion of flexible cover 12 within outer channel 30, while preventing abrasion of flexible cover 12 at the entrance portions of outer channel 30.

Figure 4:
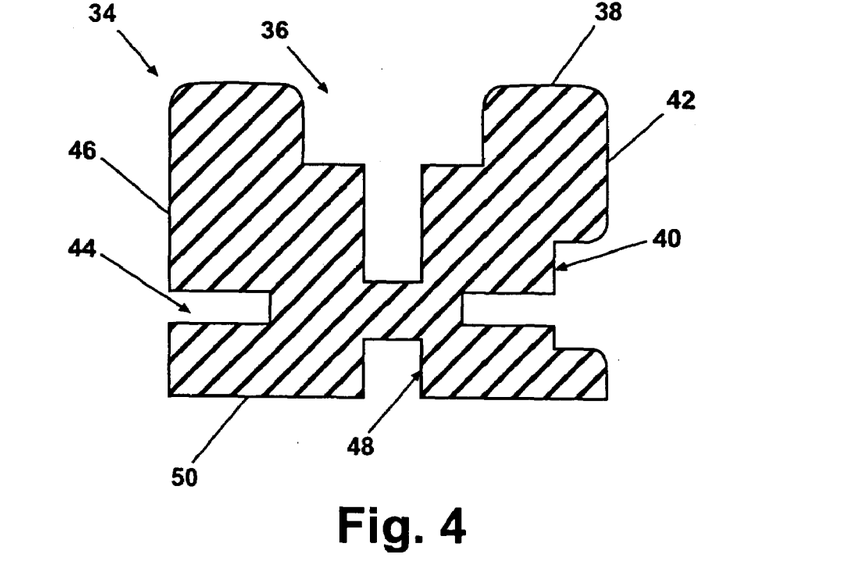
FIG. 4 is a cross sectional view similar to FIG. 3, providing an alternate embodiment of the cross-car elongated member of the present invention showing additional channels disposed therein for attachment of additional fasteners and/or internal features of the vehicle.

Referring next to FIG. 4, in an alternate embodiment, a modified cross-car elongated member 34 includes a first channel pair 36 disposed on a first surface 38, a second channel pair 40 disposed on a second surface 42, a retention channel 44 disposed on a third surface 46, and a headliner attachment feature 48 disposed on a fourth surface 50. Any one or all of second channel 40, retention channel 44, and headliner attachment feature 48 can be used in addition to first channel pair 36. Headliner attachment feature 48 is depicted as a channel, however, headliner attachment feature 48 can also include male members or clips (not shown) extending from modified cross-car elongated member 34. Retention channel 44 provides for the use of a fastener (similar to fastener 52 of FIG. 5), which engages retention channel 44.

Figure 5:
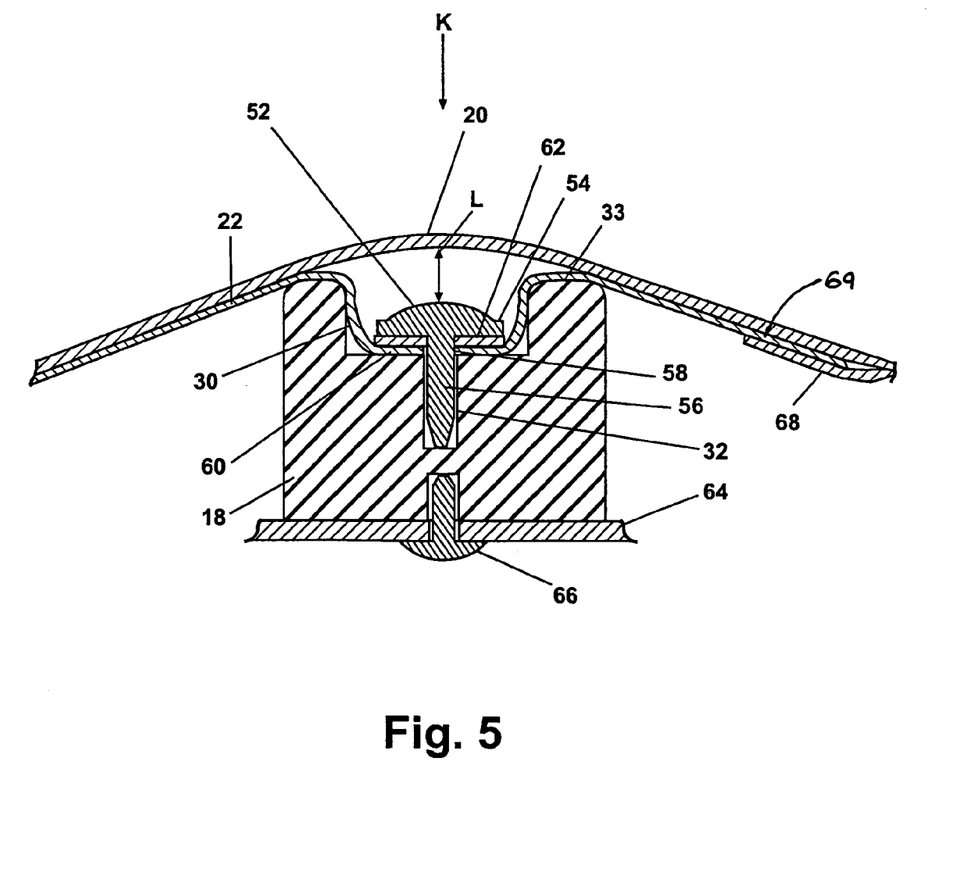
FIG. 5 is a cross sectional view, taken at line 5—5 of FIG. 1, showing the preferred installation of a self tapping fastener disposed through an inner liner of the vehicle roof.

As shown in FIG. 5, the preferred assembly of convertible roof fabric attachment system 10 is provided. A fastener 52 having a head 54 and a retention portion 56 are shown in an installed position. An aperture 58 is formed through inner layer 22 to receive retention portion 56. Fastener 52 is displaced in the direction of installation direction arrow K such that retention portion 56 engages inner channel 32, inner channel 32 thereby defining a fastener retention section, and head 54 contacts an abutting portion 60 of inner layer 22. When retention portion 56 of fastener 52 is engaged in inner channel 32, abutting portion 60 of inner layer 22 is retained in contact with the bottom of outer channel 30 by head 54. In the fully recessed position shown, a separation gap L is provided between head 54 of fastener 52 and outer layer 20, to prevent physical contact between head 54 and outer layer 20.

FIG. 5 also shows the optional use of a washer 62 disposed between head 54 of fastener 52 and abutting portion 60 of inner layer 22. The purpose of washer 62 is to increase the area of contact between fastener 52 and abutting portion 60, both to provide an increased area of contact and to reduce the potential for tear-out between fastener 52 and inner layer 22. Washer 62 can be formed of any rigid or semi-rigid material, including metals, polymeric material, and/or composite material. FIG. 5 further shows a headliner 64 disposed on an inner facing side of cross-car elongated member 18 and held in place via a fastener 66. Headliner 64 and fastener 66 are commonly made of polymeric material such as nylon. Fastener 66 can also be a metal such as steel.

In the preferred embodiment shown in FIG. 5, one or more pockets 68 are exposed on an undersurface of outer layer 20 to receive a portion 69 of inner layer 22. This permits access to engage fastener 52 with cross-car elongated member 18 and still provide a closure feature between inner layer 22 and outer layer 20, via one or more of the pockets 68. Inner layer 22 and outer layer 20 are preferably joined by stitching, but can alternately be joined by adhesive application, mechanical attachment, or a combination of these methods. Inner layer 22 can also be provided as an elastic stay pad.

Figure 6:
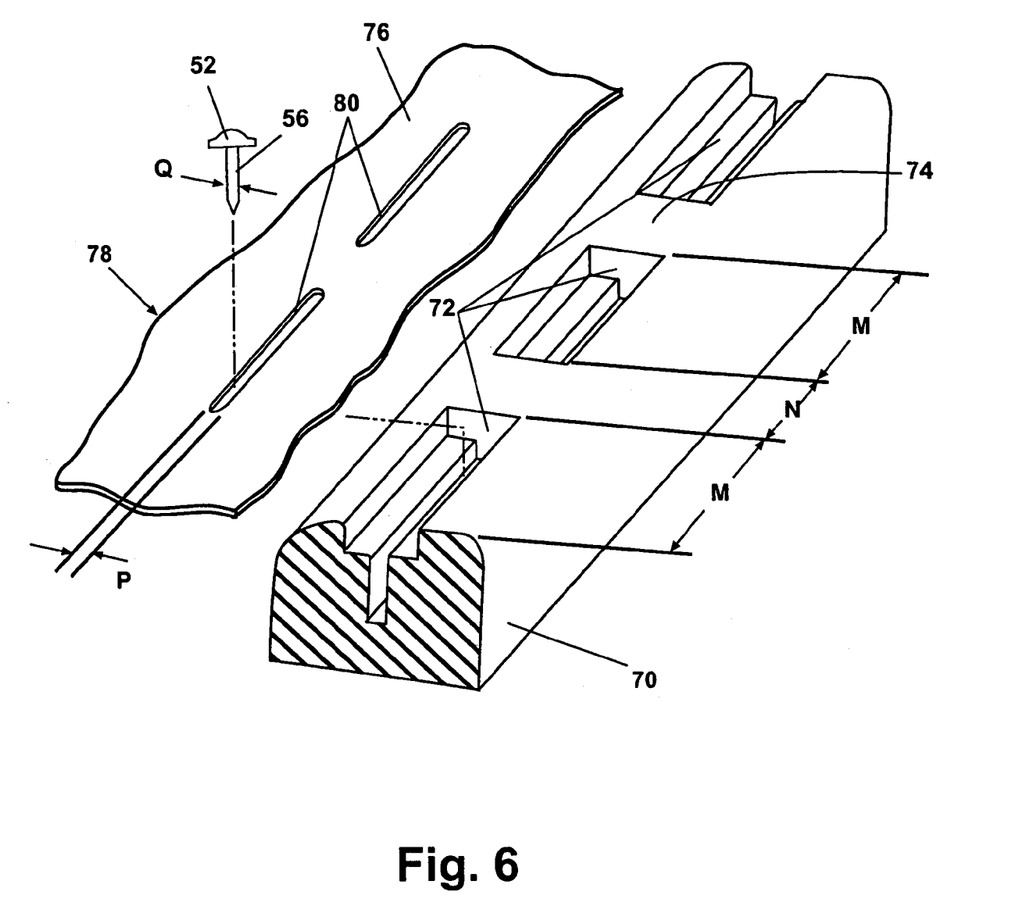
FIG. 6 is a fragmentary perspective view, similar to FIG. 2, showing an alternate elongated member embodiment with discontinuous channel segments, overlapped by longitudinal slots formed in a convertible roof cover inner layer.

In an alternate embodiment best seen in FIG. 6, a cross-car elongated member 70 includes a plurality of channel segments 72, each shaped similar to channel pair 28 of FIG. 2. Each channel segment 72 has a channel segment length "M". Each adjacent pair of channel segments 72 are separable by a spacer section 74, having a spacer section length "N". An inner layer 76 of a convertible roof 78 (only the inner layer 76 is shown for clarity), is provided with a plurality of preformed longitudinal slots 80 which are positioned to each overlap or co-align with one of the channel segments 72. A fastener 52 has an installation path shown in phantom through an exemplary longitudinal slot 80 and into one of the channel segments 72. Each of the longitudinal slots 80 preferably has a length similar to channel segment length "M", and each adjacent pair of longitudinal slots 80 is separated by a distance similar to spacer section length "N". It is important that at least a portion of each longitudinal slot 80 align with one of the channel segments 72 to permit fastener 52 installation. Longitudinal slots 80 can alternately be provided as circular or oval apertures (not shown) or modified in length from that shown. A longitudinal slot width "P" is selected to provide clearance based on the width or diameter "Q" of retention portion 56 of fastener 52.

Figure 7:
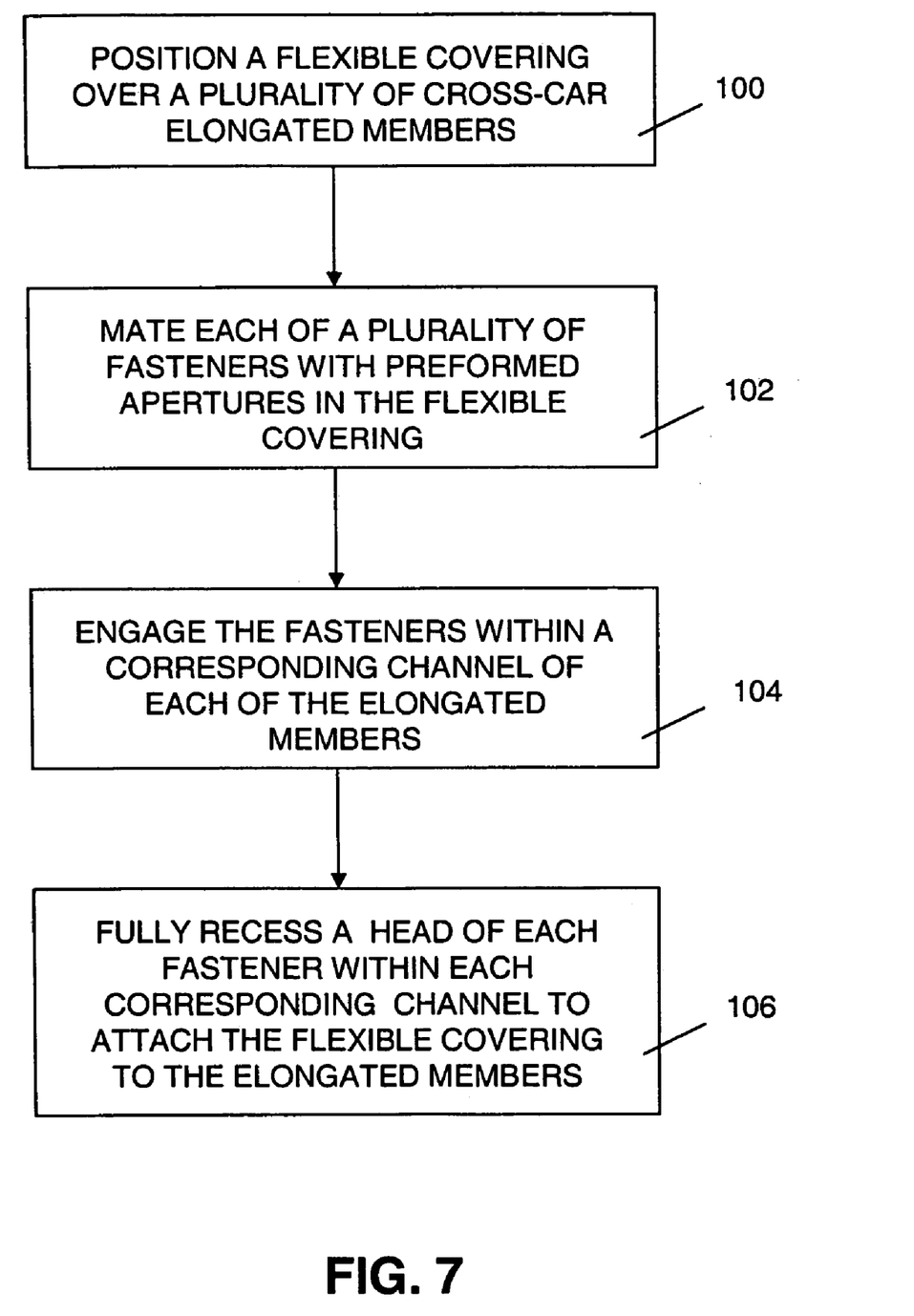
FIG. 7 is a flow chart identifying the preferred steps to attach a convertible roof cover to a roof bow.

As detailed in FIG. 7, in an initial step 100, a flexible covering is positioned over a plurality of cross-car elongated members. At next step 102, each of a plurality of fasteners are mated with preformed apertures in the flexible covering. In an engaging step 104, the fasteners are engaged with a corresponding channel of each of the elongated members. In a recessing step 106, a head of each of the fasteners is fully recessed within each corresponding channel to attach the flexible covering to the cross-car elongated members.

While various embodiments have been disclosed, it will be appreciated that other configurations may be employed within the spirit and scope of the present invention. For example, the channel pairs have been described herein as being in parallel alignment with each other. The outer and inner channels forming the channel pairs can also be non-parallel aligned (see, for example second channel pair 40) to suit the geometry of fasteners selected to connect the inner layer of the flexible cover to the cross-car elongated members. Headliner attachment feature 48 can also be formed of an outer and an inner channel, to allow fastener head recess in the outer channel. The outer and inner channels of the cross-car elongated members have also been described herein as being extruded or formed throughout the length of each of the cross-car elongated members. Either or both of the outer and inner channels can be non-continuously formed, if desirable to minimize a machining procedure for example. It is important that any channel have sufficient length to provide flexibility in locating the fasteners during installation of the flexible cover assembly. The continuous channel length is preferred to provide a maximum installation flexibility. The channel pairs can also be replaced by a generally "V" (or "U") shaped channel, having a fastener retention portion at the bottom of the "V" channel, and a width sufficient to allow a fastener head to fully recess within the "V". The apertures formed in the inner layer can also be provided in a slot-like shape to improve the flexibility of the assembly. Multiple fastener designs can be used with the present invention. Fastener designs include the preferred self tapping screws, as well as sheet metal type screws, round headed bolts, compressible polymeric fasteners, and rivets.

While various materials and dimensions have been disclosed, it should be appreciated that others may be employed. The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A convertible roof attachment system for an automobile, the system comprising:
at least one retractable, cross-car elongated member;
each elongated member including at least one channel pair having a first channel and a second channel, the second channel being located adjacent to the first channel such that the first channel opens into the second channel;
a pliable sheet; and
a pliable sheet fastener having a retention portion and a head, the retention portion being inserted through the pliable sheet such that the retention portion penetrates the pliable sheet until the head abuts the pliable sheet adjacent a pliable sheet mating portion, the retention portion being fastenably secured within the first channel, the head being located in the second channel, and both the mating portion and the head being fully recessed within the channels.

2. The system of claim 1, wherein the cross-car elongated member comprises a metal material.

3. The system of claim 1, wherein the cross-car elongated member comprises one of a polymeric material and a composite material.

4. The system of claim 1, wherein the cross-car elongated member comprises a retractable roof bow.

5. The system of claim 1, further comprising:
each elongated member having a plurality of sides; and
at least two of the sides each include at least one of the channel pairs.

6. The system of claim 1, wherein the first channel and the second channel are each formed as a plurality of intermittent channels each adjacently spaced to at least overlap each other.

7. The system of claim 1, further comprising a washer disposed between the head of the pliable sheet fastener and the pliable sheet to increase an area of the pliable sheet mating portion contacting the second channel.

8. The system of claim 1, wherein the pliable sheet is a fabric roof cover.

9. The system of claim 1, wherein the elongated member is part of a retractable top stack mechanism supporting the pliable sheet.

10. The system of claim 1, wherein the pliable sheet is a headliner.

11. The system of claim 1, further comprising at least one attachment fastener spaced apart from the pliable sheet fastener, the attachment fastener being secured and recessed within the first and second channels.

12. A flexible cover attachment system for a vehicle, comprising:
at least one cross-car elongated member;
the member including at least one pair of parallel aligned, communicating inner and outer channels disposed throughout a continuous length of the member;
a flexible covering having an inner layer and an outer layer; and
at least one fastener having a body and an enlarged head, the body penetratingly coupled with the inner layer until the head is in abutting engagement with the inner layer;

wherein the body is fastenably engaged in the inner channel until the head in abutting engagement with the inner layer is fully recessed within the outer channel such that the head is not substantially visible through the outer layer when the flexible covering is connectably attached to the member.

13. The system of claim 12, wherein the inner layer comprises a plurality of individual sections, each individual section adjacent one of the at least one cross-car elongated member.

14. The system of claim 13, wherein each said individual section comprises a polymeric sleeve disposed in a receiving pocket attached to the outer layer.

15. The system of claim 12, wherein the at least one fastener comprises a plurality of one of screws and bolts.

16. The system of claim 12, wherein the at least one fastener comprises a plurality of self tapping screws.

17. The system of claim 12, wherein the at least one fastener comprises a plurality of rivets.

18. The system of claim 12, wherein the inner layer further includes a plurality of preformed apertures sized to matingly engage the body of the at least one fastener.

19. The system of claim 12, wherein the outer layer comprises a water resistant fabric.

* * * * *